(12) United States Patent
Anderson et al.

(10) Patent No.: US 8,623,243 B2
(45) Date of Patent: Jan. 7, 2014

(54) ANTI-YELLOWING FOR THERMOCHROMIC SYSTEMS

(75) Inventors: Christopher D. Anderson, East Grand Rapids, MI (US); Harlan J. Byker, West Olive, MI (US); Samuel J. De Jong, Hudsonville, MI (US); Jeffrey L. Lameris, Grand Haven, MI (US); Derick D. Winkle, Holland, MI (US)

(73) Assignee: Pleotint, LLC, West Olive, MI (US)

( * ) Notice: Subject to any disclaimer, the term of this patent is extended or adjusted under 35 U.S.C. 154(b) by 49 days.

(21) Appl. No.: 13/310,357

(22) Filed: Dec. 2, 2011

(65) Prior Publication Data
US 2012/0138875 A1    Jun. 7, 2012

Related U.S. Application Data

(60) Provisional application No. 61/419,607, filed on Dec. 3, 2010.

(51) Int. Cl.
*C09K 9/00* (2006.01)
*G02F 1/00* (2006.01)
*G02F 1/01* (2006.01)

(52) U.S. Cl.
USPC ........ 252/583; 52/171.3; 52/173.3; 52/786.1; 345/106; 359/265; 359/275; 359/288; 359/289

(58) Field of Classification Search
USPC ........ 252/408.1, 583; 345/106; 359/265, 273, 359/275, 288, 289; 52/171.3, 173.3, 786.1
See application file for complete search history.

(56) References Cited

U.S. PATENT DOCUMENTS

| | | | |
|---|---|---|---|
| 3,236,651 A | 2/1966 | Marks et al. | |
| 6,084,702 A | 7/2000 | Byker et al. | |
| 6,103,459 A | 8/2000 | Diel | |
| 6,362,303 B1 | 3/2002 | Byker et al. | |
| 6,446,402 B1 | 9/2002 | Byker et al. | |
| 7,525,717 B2 | 4/2009 | Byker et al. | |
| 7,538,931 B2 | 5/2009 | Byker et al. | |
| 7,542,196 B2 | 6/2009 | Byker et al. | |
| 7,817,328 B2 | 10/2010 | Millett et al. | |
| 8,018,639 B2 | 9/2011 | Byker et al. | |
| 8,154,788 B2 | 4/2012 | Millett et al. | |
| 8,182,718 B2 | 5/2012 | Byker et al. | |
| 8,431,045 B2 | 4/2013 | Byker et al. | |
| 2003/0113550 A1 | 6/2003 | Millett et al. | |
| 2008/0100902 A1* | 5/2008 | Byker et al. | 359/288 |
| 2008/0106781 A1 | 5/2008 | Byker et al. | |
| 2010/0316846 A1 | 12/2010 | DeJong et al. | |
| 2012/0001134 A1 | 1/2012 | Byker et al. | |

FOREIGN PATENT DOCUMENTS

| | | |
|---|---|---|
| WO | 00/21748 | 4/2000 |
| WO | 00/77102 | 12/2000 |
| WO | 2008/028099 | 3/2008 |
| WO | 2008/028128 | 3/2008 |
| WO | 2010/084060 | 7/2010 |
| WO | 2010/148064 | 12/2010 |

OTHER PUBLICATIONS

International Search Report and Written Opinion, International Application No. PCT/US2011/063123, mailed Apr. 19, 2012 and published Jul. 12, 2012.

* cited by examiner

*Primary Examiner* — Bijan Ahvazi
(74) *Attorney, Agent, or Firm* — Thompson Hine L.L.P.

(57) ABSTRACT

Ligand exchange thermochromic systems comprising a. a transition metal ion, iodide; and at least one material capable of minimizing or eliminating yellow color formation in the system, wherein at 25° C. the color coordinate b* value of the system is less than 30.

15 Claims, 1 Drawing Sheet

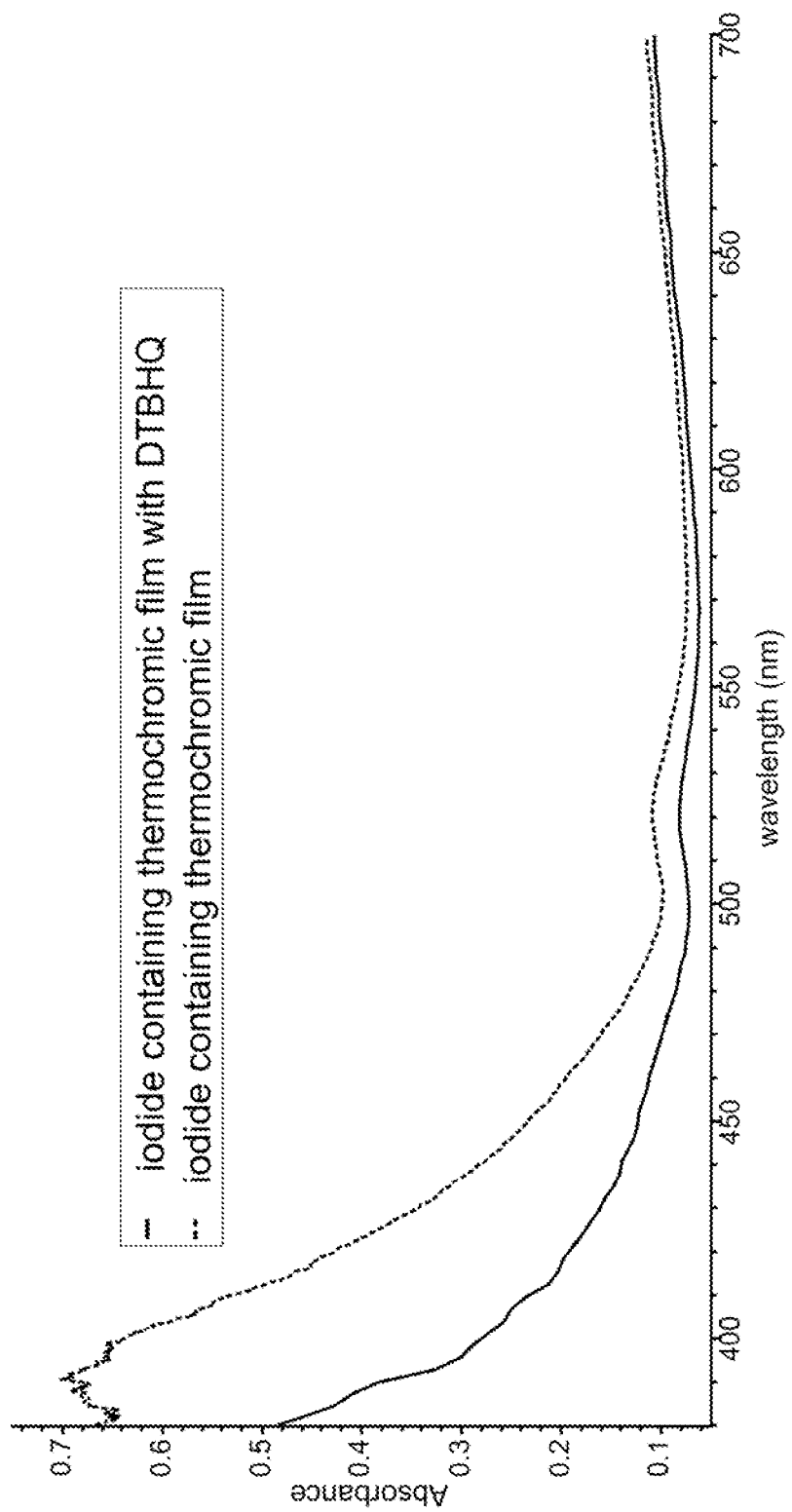

ANTI-YELLOWING FOR THERMOCHROMIC SYSTEMS

CROSS REFERENCE TO RELATED APPLICATION

This application claims the benefit of U.S. Provisional Application Ser. No. 61/419,607 filed on Dec. 3, 2010, the entire contents of which are hereby incorporated by reference.

BACKGROUND

U.S. Pat. Nos. 6,084,702; 6,446,402; 7,525,717; 7,538,931; 7,542,196; 7,817,328 and 8,018,639 describe thermochromic films and devices for use in Sunlight Responsive Thermochromic™ windows and other applications of thermochromic systems. These patents are hereby incorporated by reference. Of particular interest for use in thermochromic films are thermochromic materials based on ligand exchange of transition metal ions wherein one of the ligands exchanged is the iodide anion. As disclosed in U.S. Pat. Nos. 7,525,717; 7,538,931; 7,542,196; and 8,018,639, Co(II) and Ni(II) form strong visible light absorbing systems when Co(II) and Ni(II) form complexes involving iodide as at least one type of ligand on these metal ions. When certain of these systems are heated, large changes in absorbance take place in the visible and/or near infrared spectral ranges. The concentration of strong visible light absorbing, iodide containing complexes increases with increasing temperature and decreases with decreasing temperatures in a continuous and reversible manner in these thermochromic systems and films.

However, thermochromic systems and films comprising iodide are prone to residual yellow color formation during preparation, storage and/or use of the systems or film. This yellow color formation may be due to air sensitivity causing iodide to be oxidized by oxygen to iodine or tri-iodide. Whatever the cause, these thermochromic systems and films tend to become undesirably yellow or have an unacceptable increase in the room temperature color coordinate b* value of the system on prolonged air exposure, (for the definition of the CIELAB color coordinate b* see *Color Science: Concepts and Methods, Quantitative Data and Formulae*, 2$^{nd}$ Ed. J. Wiley & Sons: New York, 1982). Once a thermochromic film is laminated between sheets of glass much of the oxygen exposure is eliminated. While edge seals may be effective at eliminating ingress of oxygen into the film from the edges, providing seals is not always practical. Thus there is a need to minimize or eliminate the air sensitivity of thermochromic systems and films during manufacture and storage prior to lamination; and minimize or eliminate the air sensitivity of the edges of laminates once the laminates are used, such as in windows.

SUMMARY

The present application discloses thermochromic systems containing an anti-yellowing agent in an amount sufficient to minimize or eliminate the yellow color formation that is associated with some thermochromic systems. Thermochromic systems susceptible to yellowing are stabilized by inclusion of the anti-yellowing material in the composition.

In accordance with one aspect, a ligand exchange thermochromic system or film comprising a transition metal ion, iodide and a material capable of converting iodine to iodide is disclosed.

In accordance with another aspect, a ligand exchange thermochromic system or film comprising a transition metal ion, iodide and a derivative of 1,4-hydroquinone capable of converting iodine to iodide is disclosed.

In accordance with another aspect, a ligand exchange thermochromic system or film is disclosed comprising a transition metal ion, iodide and derivatives of 1,4-hydroquinone according to structure I and/or triarylphosphines substituted in the ortho position with respect to the phosphorus on at least one of the aryl groups. One or more than one of these materials may be used by itself or in combinations with others of these anti-yellowing materials.

One embodiment of the invention relates to a ligand exchange thermochromic system or film comprising a transition metal ion, iodide and one or more than one material capable of decreasing or eliminating the yellow color formation wherein the b* value of the system at 25° C. remains or is caused to become less than 30 during processing, storage or use.

In accordance with another aspect, the ligand exchange thermochromic system or film comprises iodide and transition metal ions selected from ions of nickel and ions of cobalt and combinations thereof

BRIEF DESCRIPTION OF THE DRAWING

The FIGURE shows the room temperature absorbance spectra of extruded films of poly(vinylbutyral-co-vinylalcohol-co-vinylacetate) containing an iodide based thermochromic system with and without an anti-yellowing agent (2,5-di-tert-butyl-1,4-hydroquinone, (DTBHQ)).

DETAILED DESCRIPTION

Various materials capable of decreasing or eliminating the yellow color may be included in the thermochromic films. Some of these may be used even with conventional extrusion processes. The materials set forth herein are capable of decreasing or eliminating the yellow color that may occur with some thermochromic films. In accordance with certain aspects of the present application, the anti-yellowing materials disclosed herein are capable of keeping or causing the b* of a thermochromic system or film at 25° C. to be less than 30, more particularly less than 25 and in some cases less than 15. The anti-yellowing additive may provide a decrease in the value of b* (indicative of less yellowing) of at least 5 units, more particularly at least 10 units, in certain embodiments at least 15 units and in some cases 20 units or more as compared to control systems without the additive. The anti-yellowing material can provide protection against yellowing for the thermochromic systems or films as prepared as well as after aging or exposure to heat, light, air or other conditions that may adversely affect the color of the system or film.

The presence of some phosphine or P(III) materials has a beneficial impact on the reducing yellow color in iodide containing thermochromic systems and films. However, at this time, long term durability issues have been observed in systems and films that contain most phosphines and iodide in thermochromic systems. Remarkably it has been discovered that triarylphosphines that are substituted in at least one or more than one of the aryl groups in a position ortho to the phosphorus atom are effective in minimizing yellowing while they do not interfere, to a large extent, with the long term durability of the thermochromic systems and films.

Other materials have been considered that do not themselves react rapidly with oxygen but have the potential to react with iodine to produce iodide or at least eliminate the yellow color due to iodine. Finely divided metal such as nickel, iron, zinc and aluminum tend to react slowly with iodine. Also, the metal particles must be very small so they do not scatter too much light. Other materials that work more or less well in this application are ascorbic acid and its esters, thiosulfate, dithionite, hypophosphates, hypophosphorus acid, catechols and hydroquinones.

Of these, hydroquinone derivatives are particularly useful. Particularly useful are 1,4-hydroquinones substituted in the 2, 3, 5 and/or 6 position with alkyl, branched alkyl, aryl, aralkyl, alkoxy and amino groups. Particularly useful hydroquinones include those having structure I below.

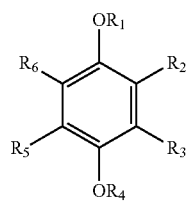

(I)

wherein $R_1$ and $R_4$ are independently selected from hydrogen, substituted and unsubstituted alkyl, branched alkyl, aryl and aralkyl and wherein $R_2$, $R_3$, $R_5$ and $R_6$ are independently selected from hydrogen, alkyl, branched alkyl, aryl, aralkyl, $OR_7$ and $NR_8R_9$ wherein $R_7$, $R_8$ and $R_9$ are independently selected from hydrogen, alkyl and branched alkyl or optionally $R_2$ and $R_3$ and/or $R_5$ and $R_6$ form a fused ring and in accordance with certain aspects, the carbon containing radicals of $R_1$-$R_9$ typically contain from 1-20 carbon atoms.

Some of the above materials may act by reducing iodine or tri-iodide to iodide. Alternatively, these compounds may remove iodine from the thermochromic system by being iodinated by iodine. Iodination will also minimize or eliminate the yellow color caused by the formation of iodine from iodide. An interesting discovery of the present invention is that there is a photochemical aspect to the anti-yellowing effect of these materials. Thus the exposure to sunlight or simulated sunlight has been observed to help decrease the appearance of residual yellow in the presence of the anti-yellowing materials of the present invention. However, regardless of the mechanism, a decrease or elimination of the yellow color formation, that otherwise normally occurs during the manufacture and storage of iodide containing thermochromic systems and films, is a benefit associated with certain aspects of the present invention. Disclosed herein are some examples of materials that can reduce or eliminate undesirable yellow color formation or unacceptable increases in the color coordinate b* value at 25° C. in thermochromic systems and films. These materials do so while not interfering, in a substantial manner, with the long term durability of the systems and films in their intended use.

The anti-yellowing materials capable of decreasing or eliminating the yellow color are incorporated into the film in an amount sufficient to decrease or eliminate yellowing during processing, storage and/or long term use in window applications or other applications. Typically, these materials are present in an amount of about 0.1-5% by weight and more particularly 0.5-2% based on the weight of the thermochromic system.

In accordance with another aspect, the ligand exchange thermochromic system or film comprises transition metal ions, iodide and one or more than one derivative of 1,4-hydroquinone according to structure I or triarylphosphines substituted in the ortho position with respect to the phosphorus on at least one of the aryl groups or combinations of such phosphines and such derivatives of 1,4-hydroquinone.

In accordance with another aspect, the ligand exchange thermochromic system or film comprises transition metal ions, iodide and one or more than one derivative of 1,4-hydroquinone selected from 2,5-di-tert-butyl-1,4-hydroquinone, 2,5-bis(1,1,3,3-tetramethylbutyl)-1,4-hydroquinone, 2,5-bis(1,1-dimethylethyl)-1,4-hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

In accordance with another aspect, the ligand exchange thermochromic system or film comprises transition metal ions, iodide and one or more than one triarylphosphine substituted in the ortho position of at least one of the aryl groups.

In accordance with another aspect, the ligand exchange thermochromic system or film comprises transition metal ions, iodide and one or more than one material capable of minimizing or eliminating the yellow color formation due to the interaction of the thermochromic system with air. The materials are capable of keeping or causing the b* of the system or film at 25° C. to be less than 30 before or after sunlight exposure.

In accordance with another aspect, the ligand exchange thermochromic system or film comprises transition metal ions, iodide, a polymer and one or more than one material capable of minimizing or eliminating yellow color formation in the system or film. The materials are capable of keeping or causing the b* of the system or film at 25° C. to be less than 30 before or after sunlight exposure.

The present application also relates to a method of minimizing or eliminating yellow color formation in a ligand exchange thermochromic system or film susceptible to such discoloration. The method comprises adding an anti-yellowing additive to a ligand exchange thermochromic system comprising transition metal ions and iodide to minimize or eliminate yellow color formation in the system or film. In accordance with certain aspects, the method results in a composition or film at 25° C. having a b* value less than 30. Furthermore, the yellow color of the system may either stay the same or decrease with time or exposure to certain environmental conditions.

In accordance with another aspect, the ligand exchange thermochromic system or film comprises transition metal ions, iodide, a poly(vinylbutyral-co-vinylalcohol-co-vinylacetate) or poly(vinyl butyral) and one or more than one material capable of minimizing or eliminating yellow color formation in the system or film. The materials are capable of keeping or causing the b* of the system or film at 25° C. to be less than 30 before or after sunlight exposure.

In accordance with another aspect, the ligand exchange thermochromic system or film comprises iodide, a poly(vinylbutyral-co-vinylalcohol-co-vinylacetate) or poly(vinyl butyral), ions of nickel and/or ions of cobalt and one or more than one derivative of 1,4-hydroquinone according to structure I or triarylphosphines substituted in the ortho position with respect to the phosphorus on at least one of the aryl groups or combinations thereof.

In accordance with another aspect, the ligand exchange thermochromic system or film comprises iodide, a poly(vinylbutyral-co-vinylalcohol-co-vinylacetate) or poly(vinyl butyral), ions of nickel and/or ions of cobalt and one or more than one derivative of 1,4-hydroquinone selected from 2,5-di-tert-butyl-1,4-hydroquinone, 2,5-bis(1,1,3,3-tetramethylbutyl)-1,4-hydroquinone, 2,5-bis(1,1-dimethylethyl)-1,4- hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

In accordance with another aspect, the ligand exchange thermochromic system or film comprises iodide, a poly(vinylbutyral-co-vinylalcohol-co-vinylacetate) or poly(vinyl butyral), ions of nickel and/or ions of cobalt and one or more than one triarylphosphine substituted in the ortho position of at least one aryl group.

In accordance with another aspect, the ligand exchange thermochromic system or film comprises iodide, a poly(vinylbutyral-co-vinylalcohol-co-vinylacetate) or poly(vinyl butyral), ions of nickel and/or ions of cobalt and tris(o-methoxyphenyl)phosphine.

In accordance with another aspect, the ligand exchange thermochromic system or film comprises transition metal ions, iodide, and one or more than one material capable of minimizing or eliminating the yellow color formation via a photochemical reaction promoted by exposure to sunlight or simulated sunlight. The materials are capable of keeping or causing the b* of the system or film at 25° C. to be less than 30 before or after sunlight exposure.

The following non-limiting examples further illustrate particular embodiments of the present invention. In the examples the compositions are in parts by weight.

In most cases, thermochromic films approximately 350-400 microns thick were prepared by extrusion through a 6 inch slot die utilizing a C. W. Brabender (Hackensack, N.J.) Intellitorque 7150 extruder.

Laminates were prepared by placing pieces of film between two pieces of 3 millimeter thick clear soda-lime float glass and then pressing the stack in a heated platen press with platen temperatures of 100° C. at a pressure of 2000 pounds per square inch for 30 seconds.

In some of the examples the laminates were exposed to light and heat in a Ci65A Weather-ometer, (WOM), from Atlas Material Testing Technology, LLC of Chicago, Ill. The WOM uses a Xenon arc lamp which was operated 0.55 watts/square meter at 340 nanometers, (nm), and the temperature in WOM was controlled to give a black panel temperature of 85° C. This is designated as WOM exposure.

In some of the examples an alternate test of the laminates involved placing them in convection oven in the dark at 80° C.

The method used for the calculation of b* values can be found in Billmeyer, F. W., Jr.; Saltzman, M.; Principles of Color Technology, 2nd Ed.; John Wiley & Sons: New York, 1981. Spectral data were recorded using an Ocean Optics, Inc. USB4000 spectrophotometer. The data were recorded in absorbance (A) units. These data were converted to transmittance (T) values using the relationship: T=10^(−A). The transmittance values were converted to CIE tristimulus values (X, Y and Z) and CIELAB coordinates (a*, b* and L*) as described in Billmeyer and Saltzman. For the calculations, transmittance data at 5 nm intervals from 380 nm to 770 nm were used. The calculations employed the 1931 CIE standard observer color matching functions and the D65 standard illuminate. In the case of laminates, absorbance values for complete laminates (two sheets of soda-lime float glass and one sheet of film) were used in the calculations. In the case of liquid thermochromic systems, the absorbance values can be measured in a spectrophotometer (using a glass or quartz cuvette) and this data can be used to calculate b* using the same method. In the case of solid thermochromic systems where absorbance and/or transmittance spectrometry is not easily applied, reflectance spectroscopy data can be substituted for transmittance data, as noted by Billmeyer and Saltzman.

The a* and b* values for the sample laminates are given in most cases. The magnitude of b* in the positive direction is a measure of the tendency toward yellowing. The term yellow color formation and an increase in the b* value are equivalent concepts in this disclosure. It may be possible for other colors to be present in a film that would obscure the observation of yellow color formation, but an increase in b* can still be measured and the present application provides methods for keeping the value of b* at 25° C. less than a value of 30. In practice, the magnitude of the absorbance at 400 nm, (recorded at 25° C.), for these particular iodide ion containing films correlates directly with the intensity of the yellow color. Thus the values for absorbance at 400 nm are sometimes provided. Keeping the value of the absorbance at 400 nm at 25° C. below a value of 0.8 is also possible in accordance with certain aspects of the present disclosure.

Example 1

The FIGURE shows the room temperature absorbance spectra of extruded films of poly(vinylbutyral-co-vinylalcohol-co-vinylacetate) also known as poly(vinyl butyral) also known as PVB, containing an iodide based thermochromic system. The films were laminated between sheets of clear soda-lime float glass. Each film was extruded and then laminated with essentially the same amount of air exposure prior to lamination. One film contained 2,5-di-tert-butyl-1,4-hydroquinone, (DTBHQ) and the other did not. The laminate with the DTBHQ containing film shows significantly less absorbance between 400 nm and 490 nm. The increased absorbance in this region in the laminated film without DTBHQ gives this laminate a distinct and undesirable yellow appearance. On the other hand the laminated film with DTBHQ has a desirable lack of yellow appearance.

Examples 2 and 3

Two thermochromic PVB films containing iodide ion were extruded. The compositions of the two films were identical except that the Example 2 film contained 1.0% by weight of DTBHQ and Example 3 film did not contain DTBHQ.

The composition of Example 2 film was as follows: 4 parts $NiI_2$; 2 parts 4-(3-phenylpropyl)pyridine; 25 parts tetrabutylammonium iodide, (TBAI); 1 part water; 6 parts 2-butyl-2-ethyl-1,3-propanediol, (BEPD); 2 parts Irganox® 1010, from BASF of McIntosh, Ala., USA; 2 parts Tinuvin® 405, from BASF of Schweiz, Switzerland; 2 parts DTBHQ; 22 parts tri(ethylene glycol)bis(2-ethylhexanoate) and 130 parts PVB.

The composition of Example 3 film was as follows: 4 parts $NiI_2$; 2 parts 4-(3-phenylpropyl)pyridine; 25 parts TBAI; 1 part water; 6 parts BEPD; 2 parts Irganox® 1010; 2 parts Tinuvin® 405; 24 parts tri(ethylene glycol)bis(2-ethylhexanoate) and 130 parts PVB.

Four samples were cut from each film. All samples were dried for 18 hours under vacuum in a desiccator over $CaSO_4$ and were subsequently made into laminates. The samples were tested by WOM exposure or by placement in convection oven in the dark at 80° C.

Sample A was WOM exposed and spectra were recorded after 0 hours, 18 hours and 84 hours of exposure.

Sample B was placed in an 80° C. convection oven and spectra were recorded after 0 hours, 18 hours and 84 hours of heating in the oven.

The edges of Sample C were sealed with epoxy and cured in an 80° C. oven for 18 hours. The sample was then WOM exposed. Spectra were recorded after 0 hours (post-curing), 18 hours and 84 hours of exposure.

The edges of Sample D were sealed with epoxy and cured in an 80° C. oven for 18 hours. The sample was then placed in an 80° C. convection oven. Spectra were recorded after 0 hours (post-curing), 18 hours and 84 hours of heating in the oven.

The results of WOM exposure are shown in Table 1

TABLE 1

Data as determined from visible spectra after various amounts of WOM exposure of laminates of thermochromic film.

|  | Hours | a* | b* | Absorbance (400 nm) |
|---|---|---|---|---|
| Example 2 laminate, sample A | 0 | −3.7 | 7.6 | 0.283 |
| Example 2 laminate, sample A | 18 | −2.6 | 4.8 | 0.199 |
| Example 2 laminate, sample A | 84 | −2.4 | 4.0 | 0.172 |
| Example 2 laminate, sample C | 0 | −5.5 | 14.5 | 0.501 |
| Example 2 laminate, sample C | 18 | −3.1 | 7.4 | 0.277 |
| Example 2 laminate, sample C | 84 | −2.3 | 5.1 | 0.211 |
| Example 3 laminate, sample A | 0 | −9.3 | 31.9 | 0.877 |
| Example 3 laminate, sample A | 18 | −10.1 | 35.5 | 0.928 |
| Example 3 laminate, sample A | 84 | −9.7 | 32.7 | 0.926 |
| Example 3 laminate, sample C | 0 | −10.3 | 35.5 | 0.866 |
| Example 3 laminate, sample C | 18 | −10.3 | 35.0 | 0.919 |
| Example 3 laminate, sample C | 84 | −9.8 | 31.8 | 0.887 |

Example 2 film and Example 3 film initially have different degrees of yellow color which is evident from the b* values as the magnitude of b* in the positive direction is a measure of the amount of yellow color. Example 2 film, sample A, (with DTBHQ added), has a b* value of +7.6 and Example 3 film, sample A, (without DTBHQ), has a b* value of +31.9. This clearly demonstrates that the addition of DTBHQ minimizes the development of yellow color during extrusion. Additionally, Example 2 film, sample A and sample C show a decrease of 47% and 65%, respectively, in the magnitude of b* after an 84 h exposure to WOM conditions indicating that DTBHQ continues to minimize yellowing and minimize the value of b* by exposure to simulated sunlight even after the films are laminated. For samples with DTBHQ, the b* values at 25° C. are initially less than 30 and remain less than 30 throughout the time of exposure. In samples without DTBHQ (Example 3 film, sample A and sample C), b* values at 25° C. changed by +2.5% and −10% after the 84 h WOM exposure and the b* values at 25° C. are initially greater than 30 and remain greater than 30.

TABLE 2

Data as determined from visible spectra after 80° C. convection oven exposure.

|  | Hours | a* | b* | Absorbance (400 nm) |
|---|---|---|---|---|
| Example 2 film, sample B | 0 | −3.7 | 8.7 | 0.327 |
| Example 2 film, sample B | 18 | −5 | 12.1 | 0.442 |
| Example 2 film, sample B | 84 | −4.7 | 10.5 | 0.379 |
| Example 2 film, sample D | 0 | −5.5 | 13.5 | 0.456 |
| Example 2 film, sample D | 18 | −5.5 | 12.9 | 0.474 |
| Example 2 film, sample D | 84 | −5.9 | 14.2 | 0.506 |
| Example 3 film, sample B | 0 | −9.6 | 32.3 | 0.864 |
| Example 3 film, sample B | 18 | −10.6 | 35.9 | 0.898 |
| Example 3 film, sample B | 84 | −10.7 | 34.0 | 0.921 |
| Example 3 film, sample D | 0 | −10.2 | 36.2 | 0.855 |
| Example 3 film, sample D | 18 | −10.3 | 35.6 | 0.914 |
| Example 3 film, sample D | 84 | −10.2 | 33.9 | 0.909 |

The data of Table 2 show that the anti-yellowing function of DTBHQ observed in the WOM is not due exclusively to a thermal process. On the time scale tested, b* values decreased by 6% in one sample (Example 3 film, sample D) and increased in the remaining samples, demonstrating a photochemical or combined photochemical/thermal aspect to the observed anti-yellowing process at temperatures of 80° C. or below. Again, for samples with DTBHQ, the b* values at 25° C. are initially less than 30 and remain less than 30 and for samples without DTBHQ the b* values at 25° C. are initially greater and remain greater than 30.

Examples 4 and 5

Compounds similar to 2,5-di-tert-butyl-1,4-hydroquinone have been discovered to also be effective anti-yellowing or b* minimizing agents. The following compositions were extruded in a manner analogous to the above examples.

Example 4 film was composed of 4 parts $NiI_2$; 2 parts 4-(3-phenylpropyl)pyridine; 25 parts TBAI; 1 part water; 8 parts BEPD; 2 parts Irganox® 1010; 2 parts Tinuvin® 405; 2 parts 2,5-bis(1,1,3,3-tetramethylbutyl)-1,4-hydroquinone; 20 parts tri(ethylene glycol)bis(2-ethylhexanoate) and 130 parts PVB.

Example 5 film was composed of 4 parts $NiI_2$; 2 parts 4-(3-phenylpropyl)pyridine; 25 parts TBAI; 1 part water; 8 parts BEPD; 2 parts Irganox® 1010; 2 parts Tinuvin® 405; 2 parts 2,5-bis(1,1-dimethylethyl)-1,4-hydroquinone; 20 parts tri(ethylene glycol)bis(2-ethylhexanoate) and 130 parts PVB.

These were made into laminates between sheets of 3 millimeter thick float glass and were subjected to WOM exposure. These parts were tested spectrophotometrically before and after WOM exposure. The results are shown in Table 3.

TABLE 3 b* and Absorbance Data Before and After WOM Exposure

|  | WOM Exposure Time | b* | Absorbance (400 nm) |
|---|---|---|---|
| Example 4 laminate | 0 h | 12.0 | 0.420 |
|  | 746 h | 8.9 | 0.308 |
| Example 5 laminate | 0 h | 13.7 | 0.489 |
|  | 762 h | 9.2 | 0.310 |

In both cases the magnitude of b* started out in the laminate at a reasonably low value, less than 30 at 25° C., and then decreased in magnitude upon exposure to WOM conditions. These results are consistent with the discovery that hydroquinone derivatives are excellent anti-yellowing agents for use in iodide containing thermochromic films.

Examples 6-10

Other hydroquinone derivatives have also been evaluated using similar tests. Films were extruded as described above using the following formulations.

Example 6 film: 4 parts $NiI_2$; 2 parts 4-(3-phenylpropyl) pyridine; 25 parts TBAI; 1 part water; 8 parts BEPD; 2 parts Irganox® 1010; 2 parts Tinuvin® 405; 22 parts tri(ethylene glycol)bis(2-ethylhexanoate) and 130 parts PVB.

Example 7 film: 4 parts $NiI_2$; 2 parts 4-(3-phenylpropyl) pyridine; 25 parts TBAI; 1 part water; 8 parts BEPD; 2 parts Irganox® 1010; 2 parts Tinuvin® 405; 2 parts 2,3,5-trimethyl-1,4-hydroquinone; 22 parts tri(ethylene glycol)bis(2-ethylhexanoate) and 130 parts PVB.

Example 8 film: 4 parts $NiI_2$; 2 parts 4-(3-phenylpropyl)pyridine; 25 parts TBAI; 1 part water; 8 parts BEPD; 2 parts Irganox® 1010; 2 parts Tinuvin® 405; 2 parts 1,4-hydroquinone bis(2-hydroxyethylether); 22 parts tri(ethylene glycol)bis(2-ethylhexanoate) and 130 parts PVB.

Example 9 film: 4 parts $NiI_2$; 2 parts 4-(3-phenylpropyl)pyridine; 25 parts TBAI; 1 part water; 8 parts BEPD; 2 parts Irganox® 1010; 2 parts Tinuvin® 405; 2 parts 3,5-di-tert-butyl-4-hydroxyanisole; 22 parts tri(ethylene glycol)bis(2-ethylhexanoate) and 130 parts PVB.

Example 10 film: 20 parts $NiI_2$; 10 parts 4-(3-phenylpropyl)pyridine; 125 parts TBAI; 5 parts water; 90 parts BEPD; 10 parts Lowinox 1790; 10 parts Tinuvin® 405; 1 part 2,3,5,6-tetramethyl-1,4-hydroquinone; 125 parts tri(ethylene glycol)bis(2-ethylhexanoate) and 625 parts PVB.

Each film was used to make laminates as before. These parts were tested spectrophotometrically before and after WOM exposure as shown in Table 4.

TABLE 4 b* and Absorbance Data Before and After WOM Exposure

|  | WOM Exposure Time | b* | Absorbance (400 nm) |
| --- | --- | --- | --- |
| Example 6 laminate | 0 h | 51.7 | 0.93 |
|  | 18 h | 53.6 | 0.94 |
|  | 42 h | 52.1 | 0.92 |
| Example 7 laminate | 0 h | 6.7 | 0.28 |
|  | 18 h | 2.5 | 0.14 |
|  | 42 h | 2.4 | 0.15 |
| Example 8 laminate | 0 h | 31.8 | 0.89 |
|  | 18 h | 27.4 | 0.81 |
|  | 42 h | 15.4 | 0.55 |
| Example 9 laminate | 0 h | 32.5 | 0.89 |
|  | 18 h | 18.9 | 0.67 |
|  | 42 h | 5.1 | 0.24 |
| Example 10 laminate | 0 h | 12.1 | 0.46 |
|  | 423 h | 7.9 | 0.33 |

In Example 6, without a hydroquinone derivative, the at 25° C. was initially and remained greater than 30. For Examples 7-10 the magnitude of b* started lower and then decreased in magnitude upon exposure to WOM conditions of simulated sunlight. In Examples 8 and 9, b* at 25° C. was initially greater than 30 but quickly dropped to a value less than 30 with WOM exposure. This again demonstrates that hydroquinone derivatives are excellent anti-yellowing agents for use in iodide containing thermochromic films.

Example 11

Substituted phosphines have also been shown to be effective anti-yellowing agents. A film was extruded with the following composition: 20 parts $NiI_2$; 10 parts 4-(3-phenylpropyl)pyridine; 120 parts TBAI; 5 part water; 90 parts BEPD; 5 parts Anox® IC-14 from Chemtura Corporation of Middlebury, Conn., USA; 10 parts Tinuvin® 405; 1 part tris(o-methoxyphenyl)phosphine; 120 parts tri(ethylene glycol)bis(2-ethylhexanoate) and 625 parts PVB.

This film was used to make a laminate as before and was measured spectrophotometrically before and after WOM exposure. The data are given in Table 5.

TABLE 5 b* and Absorbance Data Before and After WOM Exposure for Example 11.

|  | WOM Exposure Time | b* | Absorbance (400 nm) |
| --- | --- | --- | --- |
| Example 11 laminate | 0 h | 13.5 | 0.52 |
|  | 636 h | 6.6 | 0.261 |

In Example 11 the magnitude of b* at 25° C. was initially less than 30 and decreased upon exposure to WOM conditions (simulated sunlight), demonstrating substituted phosphines can also function as anti-yellowing agents for use in iodide containing thermochromic films. This film was tested by long term WOM exposure and showed very little degradation as compared to films with triarylphosphines that are not substituted on the aryl group in a position ortho to the phosphorus atom.

The above examples demonstrate the effectiveness of several compounds to act as anti-yellowing agents in the bulk of the film within laminates which is an exciting discovery. However another confounding problem is the propensity of thermochromic laminates made with iodide containing films to progressively develop yellow color or increase in measured b* values along the edge of the laminates.

Examples 12 and 13

The following experiment was performed to evaluate the ability of these anti-yellowing agents to act as protective materials, preventing edge yellowing of laminates. Two films were extruded with the following compositions:

Example 12 film was composed of 4 parts $NiI_2$; 2 parts 4-(3-phenylpropyl)pyridine; 24 parts TBAI; 1 part water; 20 parts BEPD; 1 parts Anox IC-14; 2 parts Tinuvin® 405; 20 parts tri(ethylene glycol)bis(2-ethylhexanoate) and 125 parts PVB.

Example 13 film was composed of 4 parts $NiI_2$; 2 parts 4-(3-phenylpropyl)pyridine; 25 parts TBAI; 1 part water; 8 parts BEPD; 1 part Anox IC-14; 2 parts Tinuvin® 405; 2 parts 2,5-di-tert-butyl-1,4-hydroquinone; 20 parts tri(ethylene glycol)bis(2-ethylhexanoate) and 130 parts PVB.

The films were used to make laminates as before. Visual inspection of these laminates showed no yellowing at the edges. These laminates were placed outdoors on a rack in West Olive, Mich., USA facing West during late-September to mid-October of 2011. The racking system covered approximately 1 centimeter on the top and bottom edges of the laminate. After 10 days the laminates were visually inspected.

The Example 12 laminates showed yellowing along all four edges. The yellow color was most pronounced along the two edges that the rack did not cover and the ingress of yellow color was 0.2 centimeter from each of these two edges. Along the edges that were covered by rack, a fainter yellow color could be seen from the edges to 0.4 centimeter into the laminate.

The Example 13 laminates showed no evidence of yellowing on the two edges that were exposed to sunlight and showed a very faint yellow color up to 0.5 centimeter from the edges of the laminate that were covered by the rack. The yellow color observed in the Example 13 laminate was less intense than that observed in the Example 12 laminate.

After inspection, these laminates were returned to testing. After a total of 32 days outdoors, the laminates were visually inspected again.

The Example 12 laminate showed yellowing along all four edges. The yellow color remained most pronounced along the two edges that the rack did not cover and the ingress of yellow color was 0.5 centimeter from each of these two edges. Along the edges that were covered by the rack, a fainter yellow color could be seen from the edge to 1.0 centimeter into the laminate.

The Example 13 laminate was essentially unchanged from the previous inspection. No evidence of yellowing on the two edges that were exposed to sunlight was observed, and the very faint yellow color persisted along the edges up to 0.5 centimeter from the edge of the laminate that were covered by the rack.

Based on these observations, DTBHQ provides a protective role in preventing or at least significantly decreasing the development of edge yellowing. The unexpected synergy between the use of anti-yellowing materials and sunlight exposure or simulated sunlight exposure in minimizing the appearance of objectionable yellow appearance in laminates was confirmed.

Example 14

In a commercial scale embodiment of the invention, 2000 pounds of a composition consisting of 4 parts $NiI_2$; 2 parts 4-(3-phenylpropyl)pyridine; 26 parts TBAI; 1 part water; 7 parts BEPD; 2 parts Irganox® 1010; 2 parts Tinuvin® 405; 2 parts DTBHQ; 23 parts tri(ethylene glycol)bis(2-ethylhexanoate) and 140 parts PVB was extruded into thermochromic film. The extrusion process was carried out on a 50 mm Leistritz ZSE, 50 HP-400 from American LEISTRITZ Extruder Corp. USA of Somerville, N.J., USA. The extruder was equipped with a 70 inch slot die and a film, approximately 375 microns thick, was produced.

When this film was used to prepare a laminate as described above, the initial b* determined for the laminate was 15.0. After 548 hours of WOM exposure as described above the b* was 4.5. In both cases the color coordinate b* value at 25° C. was less than 30.

More than 200 laminates that were approximately 5 foot by 10 foot in size were prepared from this film. These laminates were used as the outer panes of insulated glass unit windows. The windows were installed in a building. As compared to similar windows prepared with film of the same formulation except without DTBHQ, these windows were markedly less yellow in appearance as installed.

Examples 15 and 16

Two thermochromic PVB films containing cobalt ion and iodide ion were extruded. The compositions of the two films were identical except that the Example 15 film contained 1.0% by weight of DTBHQ and Example 16 film did not contain DTBHQ.

The composition of Example 15 film was as follows: 2 parts bis(tetrabutylammonium)tetraiodocobaltate, $((TBA)_2CoI_4)$; 7 parts TBAI; 4 parts BEPD; 1 parts Irganox® 1010; 2 parts Tinuvin® 405; 1 part DTBHQ; 16 parts tri(ethylene glycol)bis(2-ethylhexanoate) and 67 parts PVB.

The composition of Example 16 film was as follows: 2 parts $(TBA)_2CoI_4$; 7 parts TBAI; 4 parts BEPD; 1 parts Irganox® 1010; 2 parts Tinuvin® 405; 17 parts tri(ethylene glycol)bis(2-ethylhexanoate) and 67 parts PVB.

Four samples were cut from each film and were subsequently made into laminates. The samples were tested by WOM exposure or by placement in convection oven in the dark at 80° C.

Samples A were WOM exposed and spectra were recorded after 0 hours and 18 hours of exposure. Duplicate laminates were used in this experiment. Samples B were placed in an 80° C. convection oven and spectra were recorded after 0 hours and 18 hours of heating in the oven. The results of WOM exposure are shown in Table 6.

TABLE 6

Data as determined from visible spectra after various amounts of WOM exposure of laminates of thermochromic film.

|  | Hours | b* |
| --- | --- | --- |
| Example 15 laminate, sample A1 | 0 h | 5.4 |
|  | 18 h | 3.4 |
| Example 15 laminate, sample A2 | 0 h | 5.0 |
|  | 18 h | 3.3 |
| Example 16 laminate, sample A1 | 0 h | 9.8 |
|  | 18 h | 12.8 |
| Example 16 laminate, sample A2 | 0 h | 12.3 |
|  | 18 h | 16.1 |

Example 15 film and Example 16 film initially have different degrees of yellow color which is evident from the b* values. Example 15 film, samples A1 and A2, (with DTBHQ added), have b* values of 5.4 and 5.0 respectively. Example 16 film, samples A1 and A2 (without DTBHQ), have b* values of 9.8 and 12.3 respectively. This demonstrates that the addition of DTBHQ minimizes the development of yellow color during extrusion. Additionally, Example 15 film, samples A1 and A2 show an average decrease of 35% in the magnitude of b* after 18 h of exposure to WOM conditions indicating that DTBHQ continues to minimize yellowing and minimize the value of b* by exposure simulated sunlight even after the films are laminated. For samples with DTBHQ, the b* values at 25° C. are initially less than 30 and remain less than 30 throughout the duration of this experiment. In samples without DTBHQ (Example 16 film, sample A and duplicate), b* values at 25° C. increased by an average of 31% after the 18 hours of WOM exposure, indicating the importance of anti-yellowing additives for iodide based thermochromic systems and films.

TABLE 7

Data as determined from visible spectra after 80° C. convection oven exposure.

|  | Hours | b* |
| --- | --- | --- |
| Example 15 laminate, sample B1 | 0 h | 6.3 |
|  | 18 h | 3.9 |
| Example 15 laminate, sample B2 | 0 h | 5.4 |
|  | 18 h | 3.2 |
| Example 16 laminate, sample B1 | 0 h | 9.6 |
|  | 18 h | 11.1 |
| Example 16 laminate, sample B2 | 0 h | 8.9 |
|  | 18 h | 10.1 |

The data of Table 7 show that the anti-yellowing function of DTBHQ observed in the WOM can also be observed to some extent in an 80° C. convection oven with the cobalt-based thermochromic laminates. On the time scale tested, b* values decreased by an average of 39% in Example 15 laminate, samples B1 and B2. Again, for samples with DTBHQ, the b* values at 25° C. are initially less than 30 and remain less than 30. For samples without DTBHQ (Example 16 laminate, samples B1 and B2) the b* values at 25° C. increased by an average of 15% after 18 h in an 80° C. convection oven, again pointing to the importance of anti-yellowing additives for iodide based thermochromic systems and films.

What is claimed is:

1. A ligand exchange thermochromic system comprising:
 a. a transition metal ion;
 b. iodide;
 c. a derivative of 1,4-hydroquinone material capable of minimizing or eliminating yellow color formation due to iodine or tri-iodide formation or interaction of the thermochromic system with air, or via a photochemical reaction caused by exposure to sunlight and/or simulated sunlight, wherein at 25° C. the color coordinate b* value of the system is less than 30; and
 d. a polymer.

2. The ligand exchange thermochromic system of claim 1, wherein the transition metal ion is selected from the group consisting of ions of nickel, ions of cobalt and combinations thereof.

3. The ligand exchange thermochromic system of claim 1, wherein the system comprising:
 a. a transition metal ion;
 b. iodide;
 c. a derivative of 1,4-hydroquinone capable of minimizing or eliminating yellow color formation due to iodine or tri-iodide formation, wherein at 25° C. the color coordinate b* value of the system is less than 30; and
 d. a polymer.

4. The ligand exchange thermochromic system of claim 3, wherein the derivatives of 1,4-hydroquinone are selected from the group consisting of 2,5-di-tert-butyl-1,4-hydroquinone, 2,5-bis(1,1,3,3-tetramethylbutyl)-1,4-hydroquinone, 2,5-bis(1,1-dimethylethyl)-1,4-hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

5. The ligand exchange thermochromic system of claim 1, wherein the system comprising:
 a. a transition metal ion;
 b. iodide;
 c. a derivative of 1,4-hydroquinone capable of minimizing or eliminating yellow color formation due to the interaction of the thermochromic system with air, wherein at 25° C. the color coordinate b* value of the system is less than 30; and
 d. a polymer.

6. The ligand exchange thermochromic system of claim 5, wherein the derivatives of 1,4-hydroquinone are selected from the group consisting of 2,5-di-tert-butyl-1,4-hydroquinone, 2,5-bis(1,1,3,3-tetramethylbutyl)-1,4-hydroquinone, 2,5-bis(1,1-dimethylethyl)-1,4-hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

7. The ligand exchange thermochromic system of claim 1, wherein the system in a film comprising:
 a. a transition metal ion;
 b. iodide;
 c. a derivative of 1.4-hydroquinone capable of minimizing or eliminating yellow color formation in the film wherein at 25° C. the color coordinate b* value of the film is less than 30; and
 d. a polymer.

8. The ligand exchange thermochromic system in a film of claim 7, wherein the derivatives of 1,4-hydroquinone are selected from the group consisting of 2,5-di-tert-butyl-1,4-hydroquinone, 2,5-bis(1,1,3,3-tetramethylbutyl)-1,4-hydroquinone, 2,5-bis(1,1-dimethylethyl)-1,4-hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

9. A ligand exchange thermochromic system comprising:
 a. a transition metal ion;
 b. iodide; and
 c. one or more than one material of structure I:

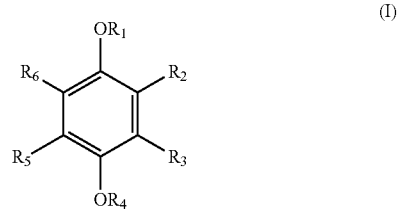

wherein $R_1$ and $R_4$ are independently selected from the group consisting of hydrogen, substituted and unsubstituted alkyl, branched alkyl, aryl and aralkyl; wherein $R_2$, $R_3$, $R_5$ and $R_6$ are independently selected from the group consisting of hydrogen, alkyl, branched alkyl, aryl, aralkyl, $OR_7$ and $NR_8R_9$, and wherein $R_7$, $R_8$ and $R_9$ are independently selected from the group consisting of hydrogen, alkyl and branched alkyl or optionally $R_2$ and $R_3$ and/or $R_5$ and $R_6$ form a fused ring.

10. The ligand exchange thermochromic system of claim 9, wherein the carbon containing radicals of $R_1$ to $R_9$ contain from 1-20 carbon atoms.

11. The ligand exchange thermochromic system of claim 9, wherein the material of structure I is selected from the group consisting of 2,5-di-tert-butyl-1,4-hydroquinone, 2,5-bis(1,1,3,3-tetramethylbutyl)-1,4-hydroquinone, 2,5-bis(1,1-dimethylethyl)-1,4-hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

12. The ligand exchange thermochromic system of claim 9, wherein the material of structure I is present in the thermochromic system at 0.1-5.0 weight percent by weight of the system.

13. The ligand exchange thermochromic system of claim 9, wherein at 25° C. the color coordinate b* value of the thermochromic system is below 30.

14. The ligand exchange thermochromic system of claim 9, wherein the system comprising:
 a. a transition metal ion;
 b. iodide; and
 c. a derivative of 1,4-hydroquinone capable of minimizing or eliminating yellow color formation via a photochemical reaction caused by exposure to sunlight and/or simulated sunlight selected from the group consisting of derivatives of 1,4-hydroquinone according to structure I.

15. The ligand exchange thermochromic system of claim 14, wherein the derivatives of 1,4-hydroquinone are selected from the group consisting of 2,5-di-tert-butyl-1,4-hydroquinone, 2,5-bis(1,1,3,3-tetramethylbutyl)-1,4-hydroquinone, 2,5-bis(1,1-dimethylethyl)-1,4-hydroquinone, 2,3,5-trimethyl-1,4-hydroquinone, 2,3,5,6-tetramethyl-1,4-hydroquinone, 1,4-hydroquinone-bis(2-hydroxyethylether), 3,5-di-tert-butyl-4-hydroxyanisole and combinations thereof.

* * * * *